(12) United States Patent
Alshinnawi et al.

(10) Patent No.: US 9,917,764 B2
(45) Date of Patent: Mar. 13, 2018

(54) SELECTIVE NETWORK ADDRESS STORAGE WITHIN NETWORK DEVICE FORWARDING TABLE

(71) Applicant: Lenovo Enterprise Solutions (Singapore) PTE. LTD., New Tech Park (SG)

(72) Inventors: Shareef Fathi Alshinnawi, Apex, NC (US); Gary David Cudak, Wake Forest, NC (US); Joseph Francis Herman, Raleigh, NC (US); John Mark Weber, Wake Forest, NC (US)

(73) Assignee: Lenovo Enterprise Solutions (Singapore) PTE., LTD., New Tech Park (SG)

( * ) Notice: Subject to any disclaimer, the term of this patent is extended or adjusted under 35 U.S.C. 154(b) by 52 days.

(21) Appl. No.: 15/004,447

(22) Filed: Jan. 22, 2016

(65) Prior Publication Data

US 2017/0214602 A1 Jul. 27, 2017

(51) Int. Cl.
*H04L 12/755* (2013.01)
*H04L 29/12* (2006.01)

(52) U.S. Cl.
CPC ........ *H04L 45/021* (2013.01); *H04L 61/6022* (2013.01)

(58) Field of Classification Search
CPC .......................... H04L 45/021; H04L 61/6022
See application file for complete search history.

(56) References Cited

U.S. PATENT DOCUMENTS

| | | |
|---|---|---|
| 8,259,726 B2 | 9/2012 | Subramanian et al. |
| 8,566,257 B2 | 10/2013 | Armstrong et al. |
| 8,681,661 B2 | 3/2014 | Narasimhan et al. |
| 9,160,701 B2 | 10/2015 | Hu et al. |
| 9,215,171 B2 | 12/2015 | Basso et al. |
| 9,397,943 B2 | 7/2016 | Song |
| 9,559,952 B2 | 1/2017 | Kapadia et al. |
| 2014/0226666 A1 | 8/2014 | Narasimhan et al. |

OTHER PUBLICATIONS

Related U.S. Appl. No. 14/737,019 entitled "Data Center Networking", filed Jun. 11, 2015, 28 pp.

*Primary Examiner* — Brian D Nguyen
(74) *Attorney, Agent, or Firm* — Jason Friday

(57) ABSTRACT

Network devices, like switches, selectively store network addresses of data packets received at their interfaces within forwarding tables. A management device determines workload devices related to a workload. The management device determines the network devices through which network traffic related to the workload among the workload devices traverses, and the network devices through which network traffic related to the workload among the workload devices does not traverse. The management device causes each network device to store or not store the network addresses of the workload devices depending on whether network traffic among the workload device traverses therethrough.

20 Claims, 5 Drawing Sheets

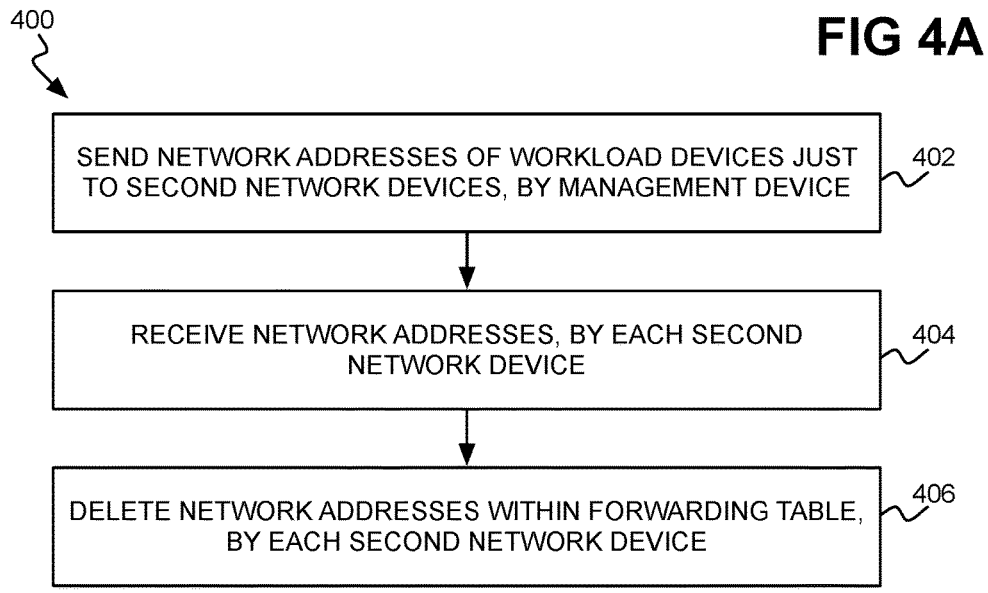
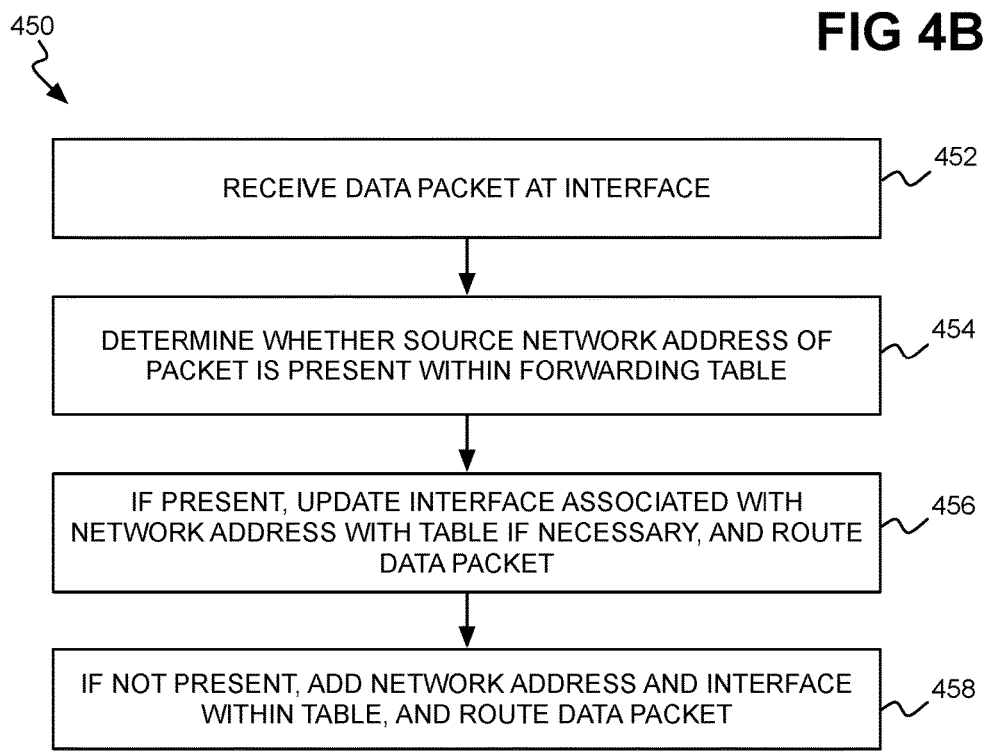

┌─────────────────────────────────────────────┐
│ SEND WORKLOAD IDENTIFIER OF WORKLOAD JUST TO FIRST │ 502
│ NETWORK DEVICES, BY MANAGEMENT DEVICE       │
└─────────────────────────────────────────────┘
                    ↓
┌─────────────────────────────────────────────┐
│ RECEIVE WORKLOAD IDENTIFIER, BY EACH FIRST NETWORK │ 504
│ DEVICE                                      │
└─────────────────────────────────────────────┘
                    ↓
┌─────────────────────────────────────────────┐
│ STORE WORKLOAD IDENTIFIER, BY EACH FIRST NETWORK │ 506
│ DEVICE                                      │
└─────────────────────────────────────────────┘

┌─────────────────────────────────────────────┐
│ RECEIVE DATA PACKET AT INTERFACE            │ 552
└─────────────────────────────────────────────┘
                    ↓
┌─────────────────────────────────────────────┐
│ IF DATA PACKET INCLUDES A WORKLOAD IDENTIFIER, │ 554
│ DETERMINE WHETHER WORKLOAD IDENTIFIER OF PACKET │
│ MATCHES ANY STORED WORKLOAD IDENTIFIER      │
└─────────────────────────────────────────────┘
                    ↓
┌─────────────────────────────────────────────┐
│ IF THERE IS A MATCH, STORE SOURCE NETWORK ADDRESS │ 556
│ AND INTERFACE AT WHICH PACKET WAS RECEIVED IN │
│ FORWARDING TABLE, AND ROUTE DATA PACKET     │
└─────────────────────────────────────────────┘
                    ↓
┌─────────────────────────────────────────────┐
│ IF NO MATCH, OR IF DATA PACKET DOES NOT INCLUDE A │ 558
│ WORKLOAD IDENTIFIER, ROUTE DATA PACKET      │
└─────────────────────────────────────────────┘

SELECTIVE NETWORK ADDRESS STORAGE WITHIN NETWORK DEVICE FORWARDING TABLE

BACKGROUND

Many if not the vast majority of computing devices today are currently networked so that they can communicate with one another as well as access resources like storage and other devices over networks, including local-area networks (LANs), wide-area networks (WANs), the Internet, intranets, extranets, and so on. Network devices like routers and switches assist in networking such devices with one another. For example, a switch may have a number of networking ports into which networking cables are inserted. The other ends of the networking cables are inserted into networking ports of other devices, such as computing devices, storage devices, other network devices, and so on.

SUMMARY

An example method includes determining, by a management device, workload devices related to a workload. The method includes determining, by the management device, first network devices of network devices through which network traffic related to the workload among the workload devices traverses, and second network devices of the network devices through which the network traffic related to the workload does not traverse. The method includes causing, by the management device, each network device to store or not store network addresses of the workload devices depending on whether the network device is one of the first network devices or one of the second network devices.

An example non-transitory computer-readable data storage medium stores computer-executable code executable by a management device to perform a method. The method includes determining workload devices related to a workload. The method includes determining first network devices of network devices through which network traffic related to the workload among the workload devices traverses, and second network devices of the network devices through which the network traffic related to the workload does not traverse. The method includes causing each network device to store or not store network addresses of the workload devices depending on whether the network device is one of the first network devices or one of the second network devices.

An example network device includes interfaces. Each interface is to connect the network device to a different device. The network device includes a memory to store a forwarding table having entries. Each entry includes a network address of a device and the interface at which the device is accessible. The network device includes logic to receive from a management device instructions as to how to selectively store source network addresses of data packets received at the interfaces within the forwarding table.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 4A and 4B are flowcharts of example particular methods for selective network address storage within a network device forwarding table, according to a second implementation.

FIGS. 5A and 5B are flowcharts of example particular methods for selective network address storage within a network device forwarding table, according to a third implementation.

DETAILED DESCRIPTION

Figure 1:
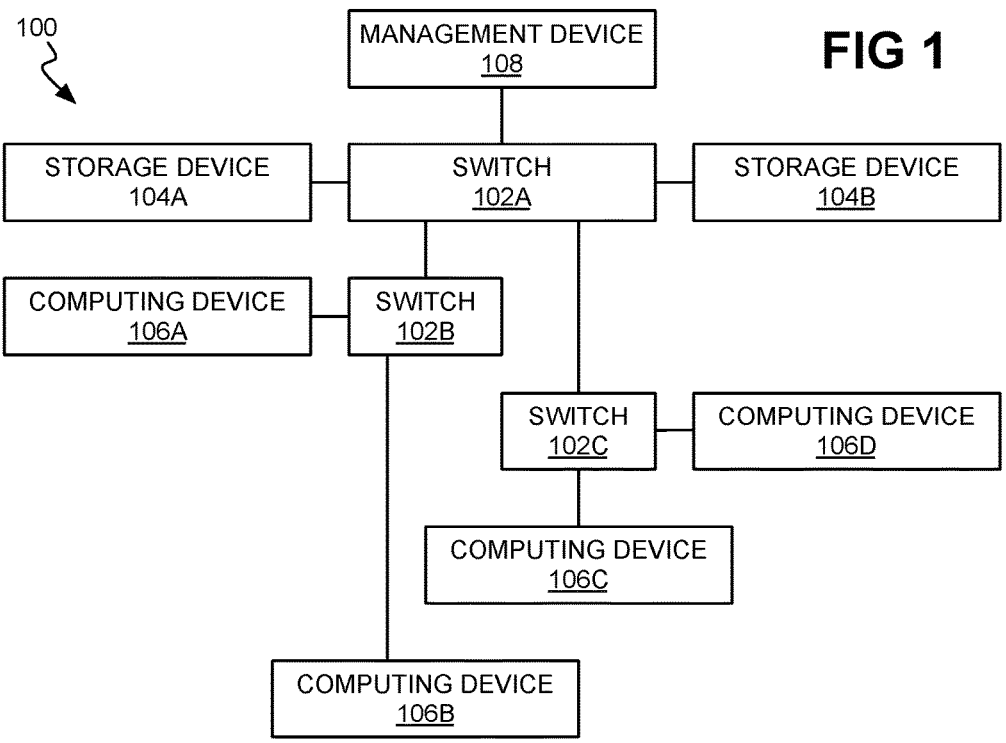
FIG. 1 is a diagram of an example system in which selective network address storage within network device forwarding tables occurs.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, network devices assist in networking computing and other devices with one another, and network devices like switches including a number of networking ports, which are more generally interfaces. Network devices can operate at different networking layers. For example, a layer two (L2) network device routes data packets based on their media-access control (MAC) addresses. A layer three (L3) network device routes data packets based on their Internet protocol (IP) addresses. An L2 network device operates at a lower networking level than an L3 network device.

At least L2 network devices such as switches generally operate as follows. A data packet that arrives at an interface of an L2 network device includes a source MAC address identifying the sender of the packet, and a destination MAC address identifying the destination of the packet. The network device includes a forwarding table, which is also known as a forwarding information base (FIB) or a content addressable memory (CAM) table. The forwarding table has a number of entries. Each entry associates a MAC address with an interface of the network device.

For an arriving data packet, the network device determines whether its forwarding table stores an entry for the source MAC address of the packet. If there is no such entry within the table, the network device adds an entry associating this MAC address with the interface of the device at which the packet arrived. If there is an entry within the table for the source MAC address, the network device updates the interface associated with the MAC address within the entry if it has changed—i.e., if the interface at which the data packet arrived is different than that indicated in the forwarding table.

The network device then looks up the destination MAC address of the data packet within the forwarding table. If the table includes an entry for this MAC address, the network device sends the data packet out on the interface associated with the MAC address within the table. If the table does not include an entry for the MAC address, then the network device may "flood" the data packet on all the interfaces except that at which the packet arrived. That is, the network device may send the data packet out on every interface except the interface at which the packet arrived. The network device will later learn the correct interface for this destination MAC address when a reply data packet arrives from the destination at a particular interface, because the source MAC address of the reply data packet will be destination MAC address of the original data packet.

As the number of devices on a given network, subnetwork, or a network partition increases, the size of the forwarding table of each network device increases as well. Therefore, network devices, like switches, have to have increasing amounts of physical memory to store their forwarding tables to ensure optimal networking performance. If a network device has undersized memory, entries will be dropped from its forwarding table, which means that, for instance, the flooding process described above will be performed more often, potentially saturating the network with network traffic and causing network congestion. However, upgrading network devices with more memory, or replacing them with such devices that have more memory, can be a costly proposition, particularly in larger enterprises.

Disclosed herein are techniques that minimize the sizes of the forwarding tables of network devices within a network, and thus that ameliorate the need for network devices with ever increasing amounts of physical memory even as the number of devices on the network increases. The techniques disclosed herein involve selectively storing network addresses within a network device forwarding table. For a given workload, the workload devices, such as computing devices, storage devices, and so on, related to this workload are determined. The network devices of the network are classified as either network devices through which network traffic among the workload devices related to the workload traverses, or network devices through which network traffic among the workload devices related to the workload does not traverse. Each network device is caused to store or not store network addresses of the workload devices within its forwarding table, depending on the network device's classification.

As such, the number of network addresses that a network device has to store within its forwarding table is reduced. A network device just stores the network addresses of the workload devices associated with workloads that generate network traffic that passes through the network device. For other network traffic that passes through the network device, the network device does not store the network addresses of such data packets within its forwarding table. The techniques disclosed herein thus leverage the novel insight that most network traffic within a network will be related to workloads, and therefore the network devices of the network should store network addresses regarding the network traffic related to the workloads that has to pass through them.

As a straightforward example, a first switch may directly be connected to a computing device and a first storage device related to a particular workload, as well as to a second switch that is connected to a second storage device unrelated to this workload. The first switch stores the network addresses of the computing device and the first storage device, whereas the second switch does not. This is because most if not the vast majority of the network traffic generated by the computing device and the first storage device will be related to the workload. However, occasionally but infrequently the computing device may access the second storage device. Such network traffic traverses the second switch, but the second switch does not store the network address of the computing device, because it is presumed that the amount of such workload-unrelated network traffic will be minor and relatively insignificant.

Stated another way, then, the techniques disclosed herein provide for an intelligent manner by which to determine which network addresses of network traffic that traverses a network device should be stored within the device's forwarding table. Therefore, the size of the forwarding table will not grow indiscriminately, decreasing if not eliminating the potential of network addresses being dropped from the forwarding table that relate to network traffic the network device will receive most often. Rather, the selective network address storage within a network device forwarding table is governed on the assumption that most network traffic within a network will be related to workloads, such that storage of network addresses should occur in accordance with this assumption.

FIG. 1 shows an example system 100 in which selective network address storage occurs within network device forwarding tables. The system 100 includes switches 102A, 102B, and 102C, which are collectively referred to as switches 102, which are more generally network devices, and which may be L2 switches. The system 100 includes storage devices 104A and 104B, which are collectively referred to as storage devices 104, and which can be storage-area networks (SANs), network-attached storage (NAS) devices, and so on. The system includes computing devices 106A, 106B, 106C, and 106D, which are collectively referred to as computing devices 106, and which can be client computing devices, server computing devices, desktop computer, laptop computers, and so on. The computing devices 106 and the storage devices 104 are different types of workload devices, which are devices that are used in order for workloads to be performed.

The system also includes a management device 108, which is responsible for managing workloads performed by the computing devices 106 in relation to data stored on the storage devices 104. For instance, the management device 108 by a server computing device. Workload management can occur in a passive or active manner. Passively, when one or more computing devices 106 initiate a workload, the devices 106 may notify the management device 108 of the workload. Either the management device 108 or these computing devices 106 may determine which of the storage devices 104 stores the data related to the workload. Actively, the management device 108 may receive requests for users for workloads to be performed. The management device 108 may assign one or more computing devices 106 to the workload, and may determine which of the storage devices 104 stores the data related to the workload.

For example purposes, assume that there are three workloads A B, and C. Workload A is performed by computing devices 106A and 106B in relation to data stored on storage device 104B. Workload B is performed by computing device 106C in relation to data stored on storage device 104A. Workload C is performed by computing device 106D in relation to data stored on storage device 104B.

The management device 108 causes the switches 102 to selectively store the network addresses, such as MAC addresses, of the storage devices 104 and of the computing devices 106, depending on which workloads' network traffic among the devices 104 and 106 traverses therethrough. Because workload A is performed by computing devices 106A and 106B in relation to data stored on storage device 104B, network traffic related to workload A among the devices 104B, 106A, and 106B traverses through switches 102A and 102B. As such, the switches 102A and 102B are caused to store the addresses of the devices 104B, 106A, and 106B, and the other switch 102C is caused to not store these addresses.

Because workload B is performed by computing device 106C in relation to data stored on storage device 104A, network traffic related to workload B between the devices 104A and 106C traverses through switches 102A and 102C. The switches 102A and 102C are caused to store the network addresses of the devices 104A and 106C, and the other switch 102B is caused to not store these addresses. Because workload C is performed by computing device 106D in relation to data stored on storage device 104B, network traffic related to workload C among the devices 104B and 106D traverses through switches 102A and 102C. The switches 102A and 102C are caused to store the network addresses of the devices 104B and 106D, and the other switch 102B is caused to not store these addresses.

In this example, the switch 102A stores the network addresses of both the storage devices 104 and of all the computing devices 106, because network traffic pertaining to each of the workloads A, B, and C may traverse the switch 102A. The switch 102B stores just the network addresses of the storage device 104B and of the computing devices 106A and 106B, because network traffic pertaining to just the workload A may traverse the switch 102B. The switch 102C stores just the network addresses of the storage devices 104A and of the computing devices 106C and 106D, because network traffic pertaining to just the workloads B and C may traverse the switch 102C.

Network traffic unrelated to the workloads A, B, and C may still occur within the system 100. For example, the computing device 106C may access the storage device 104B occasionally outside of the auspices of a workload. In this case, network traffic between the devices 104B and 106C traverses through the switches 102A and 102C. However, the switch 102C does not store the network address of the storage device 104B, since the storage device 104B does not participate in any workload to which network traffic relates that passes through the switch 102C. Thus, even when a data packet is received by the switch 102C from the storage device 104B for the computing device 106C, the switch 102C may not store the network address of the storage device 104B.

Figure 2:
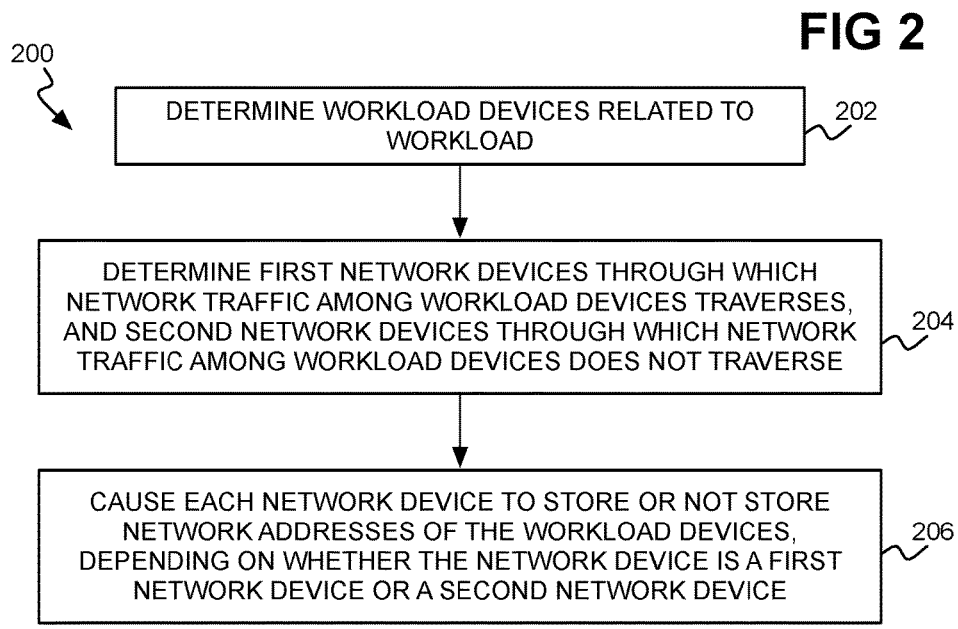
FIG. 2 is a flowchart of an example general method for selective network address storage within a network device forwarding table.

FIG. 2 shows an example general method 200 that a management device, such as the management device 108, performs to achieve selective storage of network addresses of workload devices like the devices 104 and 106 within forwarding tables of network devices like the switches 102. The method 200 is performed for each workload. The management device determines the workload devices related to a workload (202), which are the devices that perform data processing of the workload, or that store data related to the workload. As noted above, the management device may assign computing devices to a workload, or may be notified by one or more computing devices that they are initiating a workload. The management device may have information as to which storage devices store data regarding which workloads, or the management device may query the storage devices to learn which storage device(s) store data regarding a workload.

The management device determines first network devices and second network devices (204). That is, the management device effectively divides the network devices into first network devices for the workload in question, and into second network devices for the workload in question. First network devices are those through which network traffic related to the workload traverses among the workload devices determined in part 202. Second network devices are those through which network traffic related to the workload does not traverse among the workload devices determined in part 202.

For instance, the management device may have a network map as to which devices are directly connected to each network device. Such a network map may be constructed, for example, by interrogating the network devices via the simple network management protocol (SNMP), or in another way. Ultimately, the management device causes each network device to store, or not store, network addresses of the workload devices, depending on whether the network device is a first network device or a second network device (206). Three example implementations of part 206 are now described.

Figure 3A:
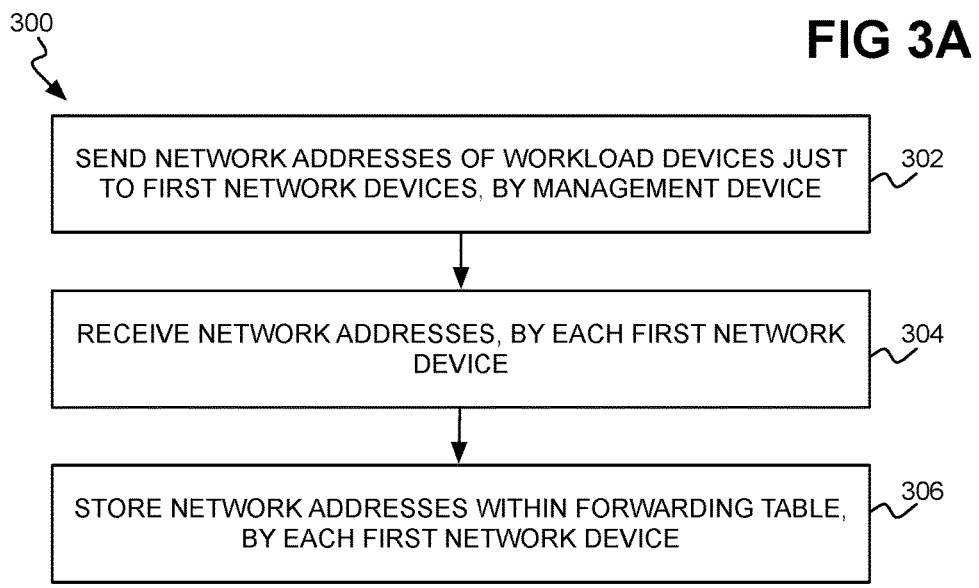
FIGS. 3A and 3B are flowcharts of example particular methods for selective network address storage within a network device forwarding table, according to a first implementation.
Figure 3B:
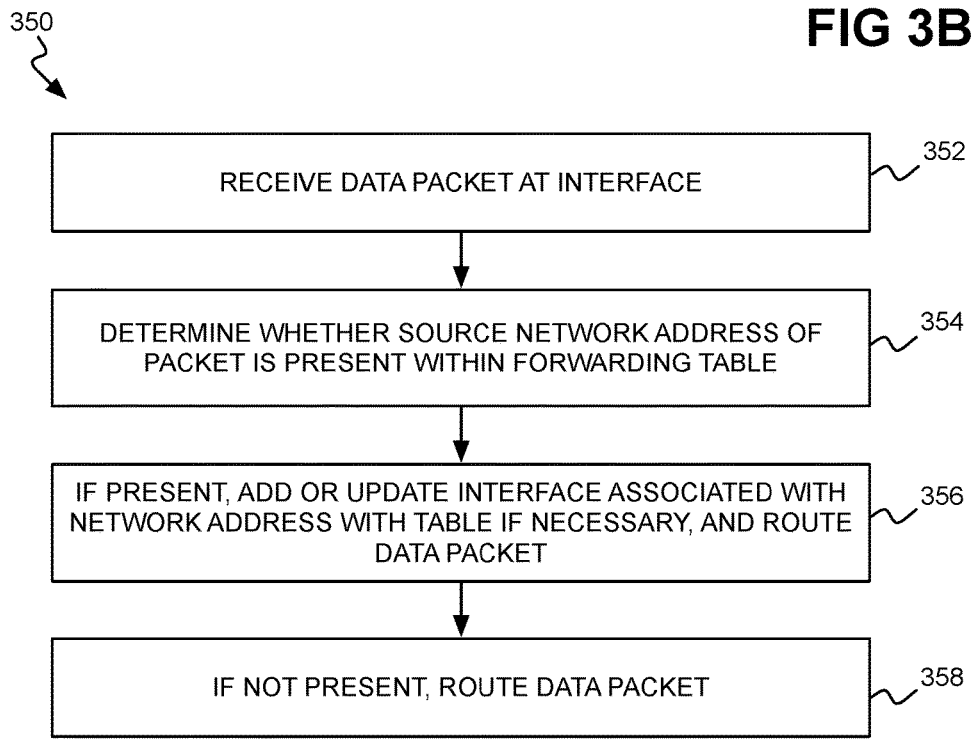

FIGS. 3A and 3B show example methods 300 and 350, respectively, of a first implementation of part 206 of the method 200. In the method 300 of FIG. 3A, the management devices sends the network addresses of the workload devices related to a particular workload just to the first network devices that have been determined, and not to the second network devices (302). The management device sends the network addresses along with an instruction to store them. The first network devices (and not the second network devices) each receive these network addresses along with the instruction (304), and store the network addresses within their forwarding tables (306). The method 300 is repeated for each different workload, which means that each network device will ultimately receive the network addresses of workload devices pertaining to workloads that the network traffic of which will traverse the network device in question. The method 300 may be performed once for each different workload, when the workload is first initiated, and may not have to be performed again for a particular workload unless the workload devices pertaining to that workload change.

In this implementation, a network device does not add network addresses to its forwarding table unless instructed to do so in accordance with the method 300. For example, when a data packet arrives at the network device, the network device will not add the source network address of the data packet to its forwarding table if the network address is not already present within the forwarding table. As noted above, the forwarding table associates network addresses with interfaces. When the management device sends the network addresses to the first network devices in part 300, each first network device may store the network addresses within entries of its forwarding table as being associated with null values for the interfaces thereof. As data packets arrive matching the network addresses, the identities of the interfaces may then be added to these entries.

This is explained in relation to the method 350 of FIG. 3B, which describes what occurs at each network device (regardless of whether the network device is a first network device or a second network device as to a particular workload) in the first implementation. A data packet is received at an interface of a network device (352). The data packet includes at least a source network address identifying the sender of the packet, a destination network address identifying the recipient of the packet, and a payload. The network device determines whether the source network address of the packet is present within its forwarding table (354).

If the source network address of the packet is present, then the network device adds or updates the interface associated with this network address within the forwarding table if necessary, and routes the data packet out of the device (356). For instance, if the source network address of the packet is stored within an entry of the forwarding table but no interface is associated with this network address within the entry yet, then the network device adds the interface to this entry. If the source network address is stored within an entry with an interface that is different than that at which the packet was received, the interface is updated within the forwarding table to that at which the packet was received. The latter scenario may occur, for instance, when network cables are switched among the physical ports (corresponding to the interfaces) of the network device.

By comparison, if the source network address of the packet is absent from the forwarding table, the network device simply routes the data packet of the device without adding the network address to the table (358), which is a departure from conventional packet processing. That is, in the first implementation, the only time that network addresses are added to a network device's forwarding table may be responsive to receiving them from the management device in accordance with the method 300. Routing a data packet out of the network device in parts 356 and 358 may be performed by looking up the destination network address of the packet within the forwarding table, and if present, sending the packet out of the device at the interface associated with the destination address within the table. If not present, the packet may be sent out of the device at all the interfaces except the interface at which the packet was received.

FIGS. 4A and 4B show example methods 400 and 450, respectively, of a second implementation of part 206 of the method 200. In the method 400 of FIG. 4A, the management device sends the network addresses of the workload devices related to a particular workload just to the second network devices that have been determined, and not to the first network devices (402). The management device sends the network addresses along with an instruction to purge them. The second network devices (and not the first network devices) each receive these network addresses along with the instruction (404), and deletes the network addresses from their forwarding tables (406). That is, each second network device deletes any entry from its forwarding table matching any network address received from the management device. The method 400 is repeated for each different workload, which means that each network device will ultimately receive the network addresses of workload devices pertaining to workloads that the network traffic of which will not traverse the network device in question.

In this implementation, each network device adds network addresses to its forwarding table as it receives data packets. Periodically, the method 400 is performed, and each network device removes entries from its forwarding table that relate to network addresses of workload devices pertaining to workloads that the network traffic of which does not traverse through the network device. As such, the method 400 may be considered in effect a garbage collection routine. Whereas in the first implementation, the network devices store just the network addresses that they have been instructed to store, in the second implementation, the network devices are periodically instructed to selectively purge network addresses from their forwarding tables. Such selective network address purging is in effect selective network storage, insofar as just the network addresses of the workload devices related to workloads that the traffic of which traverses through a given network device remain in that network device's table after purging.

The method 450 of FIG. 4B thus describes what occurs at each network device (regardless of whether the network device is a first network device or a second network device as to a particular workload) in the second implementation. A data packet is received at an interface of a network device (452). The data packet includes at least a source network address identifying the sender of the packet, a destination network address identifying the recipient of the packet, and a payload. The network device determines whether the source network address of the packet is present within its forwarding table (454).

If the source network address of the packet is present, then the network device updates the interface associated with this network address within the forwarding table if necessary, and routes the data packet out of the device (456). Because in the second implementation an entry is added to a network device's forwarding table just when a data packet arrives at an interface of the network device, there may not be any situation in which a null value is stored for the interface within an entry as there is in the first implementation. As such, the interface is updated in that if the data packet arrives at an interface different than that associated with the source network address within the forwarding table already, the corresponding entry within the table is updated with the interface at which the packet was received.

By comparison, if the source network address of the packet is absent from the forwarding table, the network device adds the network address and the interface at which the packet was received within a new entry within the forwarding table, and routes the data packet out of the device (458). The method 400 is desirably performed often enough that no network device will run out of physical memory space to add entries to their forwarding tables, because certain entries will be periodically purged in accordance with the method 400 so that new entries can be added in part 458 of the method 450. However, if the network device does run out of physical memory space to add an entry in part 458, the device may first delete the oldest added entry from the forwarding table. Routing a data packet out of the network device can occur in parts 456 and 458 as has been described above in relation to parts 356 and 358.

In the two implementations that have been described, the implementation of FIGS. 3A and 3B is a white list implementation, in which network devices receive the network addresses of the workload devices that are to be stored in their forwarding table. The implementation of FIGS. 4A and 4B, comparison is a type of black list implementation, in which network devices receive the network addresses of the workload devices that should be purged from their forwarding table, in a garbage collection-type manner. In both these implementations, the workload devices themselves do not have to modify their behavior in sending data packets. That is, they form and send data packets no differently than if these implementations were not in effect.

FIGS. 5A and 5B show example methods 500 and 550, respectively, of a third implementation of part 206 of the method 200. In the method 500 of FIG. 5A, the management device sends a workload identifier of a particular workload just to the first network devices that have been determined, and not to the second network devices (502). The management device may not send any network addresses, but does send an instruction along with the workload identifier to store it. The first network devices (and not the second network devices) each receive the workload identifier along with the instruction (504), and stores the workload identifier (506). The method 500 is repeated for each differently workload, which means that each network device will ultimately receive the workload identifier of each workload of which network traffic will traverse the network device in question. The method 500 may be performed once for each different workload, when the workload is first initiated, and may not be performed again for a particular workload.

In this implementation, the workload devices themselves change how they form and send data packets to include workload identifiers of data packets that are related to workloads. For instance, a workload device may add a workload identifier to the header of a data packet before sending the data packet, where the workload identifier identifies the workload to which the payload of the data packet pertains. A network device does not add source network addresses of received data packets to its forwarding table unless the data packets include workload identifiers that match any workload identifier the network device previously received and stored.

This is explained in relation to the method 550 of FIG. 5B, which describes what occurs at each network device (regardless of whether the network device is a first network device or a second network device as to a particular workload) in the third implementation. A data packet is received at an interface of a network device (552). The data packet includes at least a source network address identifying the sender of the packet, a destination network address identifying the recipient of the packet, and a payload, and may further include a workload identifier identifying the workload to which the payload pertains.

If the data packet includes a workload identifier, the network device determines whether the workload identifier of the packet matches any workload identifier that the device previously received from the management device and stored (554). If there is a match, the source network address and the interface at which the packet was received are stored in an entry within the network device's forwarding table, and the data packet is routed out of the device (556). The source network address and the interface can be stored within the forwarding table as described in relation to parts 454, 456, and 458 of the method 400. That is, if the network address is already present within the forwarding table, the interface associated with the address in the table is updated to the interface at which the packet was received if the stored interface differs from the interface at which the packet was received. Further, if the network address is not present within the forwarding table, then the address and the interface are stored in a new entry thereof.

If the workload identifier of the data packet does not match any workload identifier that the network device previously received and stored, or if the data packet does not include a workload identifier, then the network device simply routes the data packet out of the device without storing the network address to the table (558). This is a departure from conventional packet process similar to that of part 358 of the method 300. Routing a data packet out of the network device in parts 556 and 558 may be performed as has been described in relation to parts 356 and 358 of the method 300.

The third implementation reduces the amount of data that the management device has to send each network device, because the management device just has to send a workload identifier of a workload, and not the network addresses of the workload devices pertaining to the workload. The third implementation is also a white list implementation, in that it prescribes which network addresses each network device is to store, in an indirect manner via workload identifiers. As noted above, though, the workload devices themselves in the third implementation have to add the workload identifiers to relevant data packets.

Figure 6:
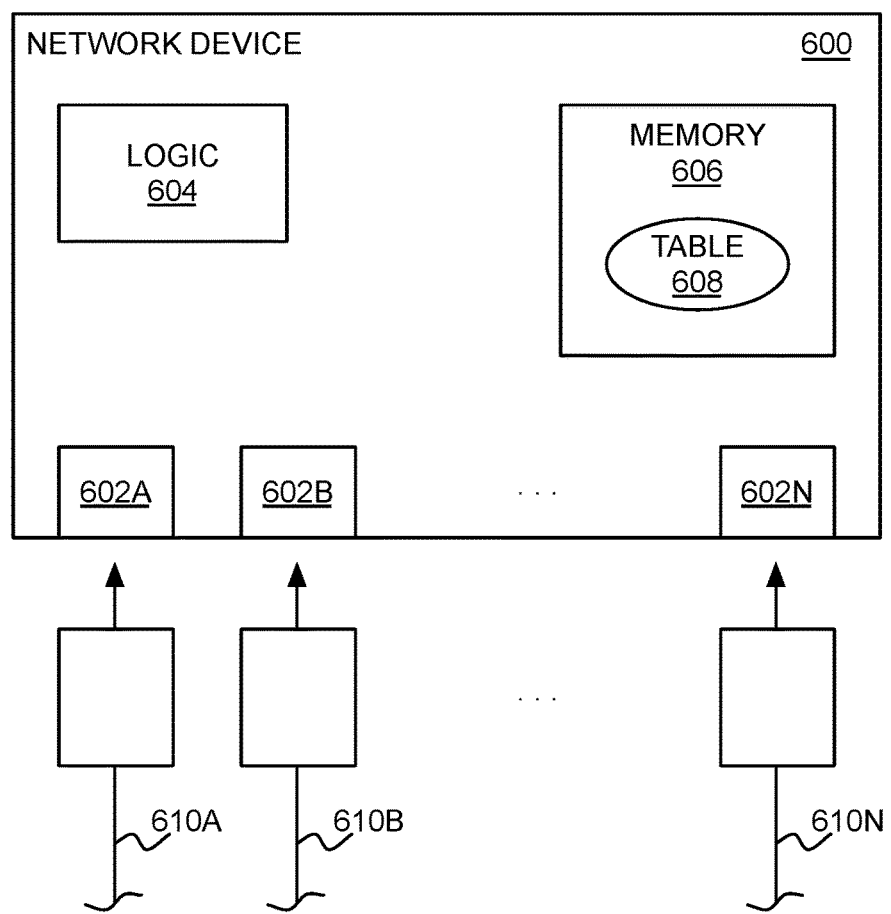
FIG. 6 is a block diagram of an example network device, such as a switch, which can selectively store network addresses.

FIG. 6 shows an example network device 600 that can selectively store network addresses in accordance with any of the implementations that have been described. The network device 600 may be a switch, such as an L2 switch that stores MAC addresses, for instance. The network device 600 includes interfaces 602A, 602B, . . . , 602N, which are collectively referred to as the interfaces 602. The network device 600 also includes at least logic 604, and memory 606, such as volatile random-access memory, storing a forwarding table 608.

The interfaces 602 may be physically realized as network ports, such as network jacks into which plugs of corresponding network cables 610A, 610B, . . . , 610N, collectively referred to as the network cables 610, are inserted. Plugs at the other ends of the network cables 610 are inserted into other devices, such as computing devices, storage devices, other network devices, and so on. In the example of FIG. 6, then, the interfaces 602 are wired interfaces at which data packets are received.

The logic 604 may be implemented as software stored on a non-transitory computer-readable data storage medium that is executed by a processor, or may be implemented completely in hardware, such as an application-specific integrated circuit (ASIC), a field programmable gate array (FPGA), and so on. The logic 604 implements any of the implementations that have been described, in relation to the interfaces 602 and the forwarding table 608 of the memory 606. Thus, as to the first implementation of FIGS. 3A and 3B, the logic 604 performs parts 304, 306, 352, 354, 356, and 508. As to the second implementation of FIGS. 4A and 4B, the logic performs 404, 406, 452, 454, 456, and 458. As to the third implementation of FIGS. 5A and 5B, the logic performs 504, 506, 552, 554, 556, and 558.

The techniques that have been disclosed herein provide for selective storage of network addresses within network devices, such as within forwarding tables of routers and other network devices. Although three specific implementations have been described, other implementations may also effect the general methodology of FIG. 2. Furthermore, although the three specific implementations have been described as disparate, they may be combined and used together as well.

It is finally noted that, although specific embodiments have been illustrated and described herein, it will be appreciated by those of ordinary skill in the art that any arrangement calculated to achieve the same purpose may be substituted for the specific embodiments shown. For instance, whereas the techniques disclosed herein have been described largely in relation to L2 switches, the techniques may be implemented in relation to other types of applicable to other types of L2 network devices, as well as to other types of network devices, such as L3 network devices. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
   determining, by a management device, a plurality of workload devices related to a workload;
   determining, by the management device, first network devices of a plurality of network devices through which network traffic related to the workload among the workload devices traverses, and second network devices of the network devices through which the network traffic related to the workload does not traverse; and
   causing, by the management device, each network device to store or not store network addresses of the workload devices depending on whether the network device is one of the first network devices or one of the second network devices.

2. The method of claim 1, wherein each of the network devices is a layer two (L2) network devices, and the network addresses of the workload devices are media-access control (MAC) addresses.

3. The method of claim 1, wherein causing each network device to store or not store the network addresses of the workload devices comprises:
   sending the network addresses of the workload devices to the first network devices and not to the second network devices, with an instruction to store the network addresses.

4. The method of claim 3, further comprising:
   receiving, by each first network device and not by each second network device, the network addresses of the workload devices and the instruction;
   storing, by each first network device and not by each second network device, the network addresses within a forwarding table thereof;
   by each network device, responsive to receiving a data packet at an interface thereof:
      determining whether a source network address of the data packet is present within the forwarding table;
      in response to determining that the source network address of the data is present within the forwarding table,
         if the source network address is not associated with an interface within the forwarding table, associating the network address within the forwarding table with the interface at which the data packet arrived;
         if the source network address is associated with an interface within the forwarding table different from the interface at which the data packet arrived, updating the interface with which the network address is associated within the forward table to the interface at which the data packet arrived;
         routing the data packet out of the network device;
      in response to determining that the source network address of the data packet is absent from the forwarding table,
         routing the data packet out of the first network device without storing the source network address of the data packet within the forwarding table.

5. The method of claim 1, wherein causing each network device to store or not store the network addresses of the workload devices comprises:
   sending the network addresses of the workload devices to the second network devices and not to the first network devices, with an instruction to purge the network addresses therefrom.

6. The method of claim 5, further comprising:
   receiving, by each second network device and not by each first network device, the network addresses of the workload devices and the instruction;
   deleting, by each second network device and not by each first network device, the network addresses from a forwarding table thereof;
   by each network device, responsive to receiving a data packet:
      determining whether a source network address of the data packet is present within the forwarding table;
      in response to determining that the source network address of the data packet is absent from the forwarding table,
         storing the source network address and an interface of the network device at which the data packet arrived within the forwarding table;
      in response to determining that the source network address of the data packet is present within the forwarding table,
         updating the source network address as stored within the forwarding table with the interface of the first network device at which the data packet arrived if the interface differs from that already stored within the forwarding table; and
      routing the data packet out of the network device.

7. The method of claim 1, wherein the workload is a given workload, the network traffic comprises a plurality of data packets, and each data packet comprises:
   a source network address identifying a device that sent the data packet; and
   a packet workload identifier identifying a workload to which the data packet pertains,
   wherein causing each network device to store or not store the network addresses of the workload devices comprises:
      sending a workload identifier of the given workload to the first network devices and not to the second network devices, with an instruction to store the source network address of each data packet traversing the first network devices of which the packet workload identifier matches the workload identifier of the given workload.

8. The method of claim 7, further comprising:
   receiving, by each first network device and not by each second network device, the workload identifier of the given workload;
   by each first network device, responsive to receiving a data packet:
      determining whether the packet workload identifier matches the workload identifier of the given workload;
      in response to determining that the packet workload identifier matches the workload identifier of the given workload, storing the source network address of the data packet along with an interface of the first network device at which the data packet arrived within a forwarding table of the network device, and routing the data packet out of the first network device; and
      in response to determining that the packet workload identifier does not match the workload identifier, routing the data packet out of the first network device without storing the source network address of the data packet.

9. The method of claim 1, wherein the workload devices comprise:
    one or more computing devices to process data related to the workload; and
    one or more storage devices to store the data related to the workload.

10. A non-transitory computer-readable data storage medium storing computer-executable code executable by a management device to perform a method comprising:
    determining a plurality of workload devices related to a workload;
    determining first network devices of a plurality of network devices through which network traffic related to the workload among the workload devices traverses, and second network devices of the network devices through which the network traffic related to the workload does not traverse; and
    causing each network device to store or not store network addresses of the workload devices depending on whether the network device is one of the first network devices or one of the second network devices.

11. The non-transitory computer-readable data storage medium of claim 10, wherein causing each network device to store or not store the network addresses of the workload devices comprises:
    sending the network addresses of the workload devices to the first network devices and not to the second network devices, with an instruction to store the network addresses.

12. The non-transitory computer-readable data storage medium of claim 10, wherein causing each network device to store or not store the network addresses of the workload devices comprises:
    sending the network addresses of the workload devices to the second network devices and not to the first network devices, with an instruction to purge the network addresses therefrom.

13. The non-transitory computer-readable data storage medium of claim 10, wherein the workload is a given workload, the network traffic comprises a plurality of data packets, and each data packet comprises:
    a source network address identifying a device that sent the data packet; and
    a packet workload identifier identifying a workload to which the data packet pertains,
    wherein causing each network device to store or not store the network addresses of the workload devices comprises:
        sending a workload identifier of the given workload to the first network devices and not to the second network devices, with an instruction to store the source network address of each data packet traversing the first network devices of which the packet workload identifier matches the workload identifier of the given workload.

14. A network device comprising:
    a plurality of interfaces, each interface to connect the network device to a different device;
    a memory to store a forwarding table having a plurality of entries, each entry including a network address of a device and the interface at which the device is accessible;
    logic to receive from a management device instructions as to how to selectively store source network addresses of data packets received at the interfaces within the forwarding table.

15. The network device of claim 14, wherein the instructions comprise a plurality of network addresses that are to be stored within the forwarding table, and the logic is to, after receiving the instructions from the management device:
    store each network address within an entry of the forwarding table;
    receive at one of the interfaces a data packet having a source network address;
    determine whether the source network address of the data packet matches any network address previously stored within the forwarding table;
    in response to determining that the source network address matches any network address previously stored within the forwarding table,
        update the entry of the forwarding table including the source network address with the interface at which the data packet was received, and route the data packet out of the network device; and
    in response to determining that the source network address does not match any network address previously stored within the forwarding table,
        route the data packet out of the network device without storing the source network address within the forwarding table.

16. The network device of claim 14, wherein the instructions comprise a plurality of network addresses that are to be purged within the forwarding table, and the logic is to, after receiving the instructions from the management device:
    delete each entry of the forwarding table of which the network address matches any network address to be purged;
    receive at one of the interfaces a data packet having a source network address;
    determine whether the source network address of the data packet matches any network address stored within the forwarding table;
    in response to determining that the source network address matches any network address stored within the forwarding table,
        updating the entry of the forwarding table including the source network address with the interface at which the data packet was received if the interface differs from that already stored within the entry;
    in response to determining that the source network address does not match any network address stored within the forwarding table,
        create a new entry within the forwarding table including the source network address and the interface at which the data packet was received; and
    route the data packet out of the network device.

17. The network device of claim 14, wherein the instructions comprise a workload identifier, and the logic is to, after receiving the instructions from the management device:
    receive at one of the interfaces a data packet having a source network address and a packet workload identifier;
    determine whether the packet workload identifier matches the workload identifier;
    in response to determining that the packet workload identifier matches the workload identifier, store the source network address of the data packet and the interface at which the data packet arrived within an entry of the forwarding table, and route the data packet out of the network device; and
    in response to determining that the packet workload identifier does not match the workload identifier, route the data packet out of the network device without storing the source network address or the interface at which the data packet arrived within the forwarding table.

18. The network device of claim 14, wherein the network device is a layer two (L2) network device, and the network address of each entry of the forwarding table is a media-access control (MAC) address.

19. The network device of claim 18, wherein the network device is a L2 network switch.

20. The network device of claim 14, wherein each interface comprises a port receptive to a first end of a network cable having a second end insertable into a port of a different device.

* * * * *